Patented Sept. 14, 1954

2,689,197

UNITED STATES PATENT OFFICE 2,689,197

PROCESS FOR COATING POLYETHYLENE ARTICLES

Hans Gerlich, Mannheim, Germany, assignor to Badische Anilin- & Soda-Fabrik Aktiengesellschaft, Ludwigshafen am Rhein, Germany No Drawing. Application April 16, 1952, Serial No. 282,715

Claims priority, application Germany April 18, 1951

7 Claims. (Cl. 117—138.8)

This invention relates to coatings on ethylene polymers and to a process of producing same.

The coating, printing and the like of foils or other articles of polyethylene or mixtures of polyethylene with other hydrocarbons has hitherto not yielded satisfactory results because the coating film possessed only slight adhesion and could readily be removed again mechanically.

I have now found that coatings of any kind, for example coatings having a uniform, closed surface as well as coatings having an interrupted surface, such as for example prints and the like, of high film elasticity and adhesion can be obtained on polyethylene and mixtures of polyethylene with other polymer hydrocarbons such as polyisobutylene or polystyrene by means of solutions of vinyl chloride polymerization products i. e. polyvinyl chloride or interpolymers of preponderating amounts of vinyl chloride with other vinyl compounds, such as vinyl esters, vinyl ethers, acrylic compounds and the like and resins, as for example alkyd resins or cyclohexanone resins, together with suitable plasticisers, as for example chlorodiphenyl, phthalic acid esters or phosphoric-acid esters, such as tricresyl phosphate. Suitable solvents are for example benzene hydrocarbons, esters, chlorinated hydrocarbons, ketones or mixtures of the same. The coating agents may be colorless, colored with soluble dyestuffs or provided with inorganic or organic pigments; they dry at normal temperatures, but if desired heating may be employed and additions of driers may be made. They are applied in the usual manner by printing, brushing, spraying or dipping.

The following examples will further illustrate this invention but the invention is not restricted to these examples. The parts are by weight.

Example 1

A clear coating lacquer is prepared by dissolving 15 parts of an interpolymer consisting of 80% of vinyl chloride and 20% of vinyl isobutyl ether and 15 parts of an alkyd resin consisting of 42% of phthalic acid and glycerine and 58% of recinoleic acid in toluene. When applied to polyethylene foils, it dries to give a film having good elasticity and adhesion. The same lacquer may be pigmented or colored with pigment colors, as for example iron oxide red, or titanium dioxide, or with soluble dyestuffs, as for example N 541 (Schultz Farbstofftabellen). Drying takes place at normal temperature or may be accelerated by the action of heat, with or without the addition of driers, such as lead-manganese-cobalt naphthenate.

Example 2

A clear coating lacquer is prepared by dissolving 25 parts of an interpolymer consisting of 80% of vinyl chloride and 20% of vinyl isobutyl ether, 5 parts of cyclohexanone resin, 5 parts of chlorodiphenyl and 3 parts of tricresyl phosphate in butyl acetate or a mixture of equal parts of toluene, xylene and butyl acetate. When applied to foils or other articles of polyethylene or mixtures of polyethylene with other hydrocarbons, the lacquer has good adhesion and elasticity.

Coloring of the lacquer and also the drying of the same may be carried out in the manner described in Example 1.

What I claim is:

1. A process for the production of well-adhering coatings on the surface of polyethylene articles which comprises applying thereto a solution containing an interpolymerization product of a major proportion of vinyl chloride with a minor proportion of vinyl isobutyl ether and drying the applied coating.

2. A process as claimed in claim 3 wherein the solutions also contain coloring materials.

3. A process for the production of well-adhering coatings on the surface of polyethylene articles which comprises applying thereto a solution containing a member of the group consisting of polyvinyl chloride and an interpolymer of a major proportion of vinyl chloride with a minor proportion of a member of the group consisting of vinyl esters, vinyl ethers and acrylic acid esters, and a plasticized alkyd resin and drying the applied coating.

4. A process for the production of well-adhering coatings on the surface of polyethylene articles which comprises applying thereto a solution containing an interpolymerization product of about 80 per cent of vinyl chloride with about 20 per cent of vinyl isobutyl ether and drying the applied coating.

5. A process as claimed in claim 1 wherein the solution also contains coloring material.

6. A process for the production of well-adhering coatings on the surface of polyethylene articles which comprises applying thereto a solution containing an interpolymerization product of a major proportion of vinyl chloride and a minor proportion of a vinyl ester and drying the applied coating.

7. A process for the production of well-adhering coatings on the surface of polyethylene articles which comprises applying thereto a solution containing an interpolymerization product of a major proportion of vinyl chloride and a minor proportion of a vinyl ether and drying the applied coating.

References Cited in the file of this patent

UNITED STATES PATENTS

| Number | Name | Date |
|---|---|---|
| 2,431,303 | Billmeyer | Nov. 25, 1947 |
| 2,467,875 | Andrews | Apr. 19, 1949 |
| 2,502,841 | Henderson | Apr. 4, 1950 |
| 2,558,803 | Wittgren | July 3, 1951 |